United States Patent [19]

Junge

[11] Patent Number: 5,492,052
[45] Date of Patent: Feb. 20, 1996

[54] PISTON-AND-CONNECTING ROD ASSEMBLY

[75] Inventor: Klaus Junge, Burscheid, Germany

[73] Assignee: Goetze GmbH, Burscheid, Germany

[21] Appl. No.: 334,391

[22] Filed: Nov. 3, 1994

[30] Foreign Application Priority Data

Nov. 3, 1993 [DE] Germany .................... 43 37 473.5

[51] Int. Cl.⁶ ................................................ F16J 1/14
[52] U.S. Cl. .................. 92/187; 92/237; 92/238; 74/579 E
[58] Field of Search .................... 92/187, 238, 239; 74/579 R, 579 E

[56] References Cited

U.S. PATENT DOCUMENTS

| | | | |
|---|---|---|---|
| 997,144 | 7/1909 | Lindsay | 74/579 E |
| 1,756,211 | 4/1930 | Reid . | |
| 1,756,761 | 4/1930 | Reid . | |
| 1,786,934 | 12/1930 | Briggs | 74/579 E |
| 1,797,493 | 3/1931 | Baxter | 74/579 E |
| 2,368,412 | 1/1945 | Cords | 92/140 |
| 2,771,327 | 11/1956 | Reinberger | 92/238 |
| 2,818,314 | 12/1957 | Nicholas . | |
| 3,552,231 | 1/1971 | Kotoc | 74/579 E |
| 3,564,978 | 2/1971 | Flitz . | |
| 3,971,355 | 7/1976 | Kottmann | 92/238 |
| 4,505,239 | 3/1985 | Deland | 74/579 E |

FOREIGN PATENT DOCUMENTS

| | | | |
|---|---|---|---|
| 37718 | 4/1926 | Denmark | 92/239 |
| 0234625 | 9/1987 | European Pat. Off. . | |
| 2534343 | 4/1984 | France . | |
| 368609 | 2/1923 | Germany . | |
| 812746 | 9/1951 | Germany . | |
| 1273913 | 7/1968 | Germany . | |
| 2602919 | 9/1976 | Germany . | |
| 2502069 | 11/1976 | Germany . | |
| 2737596 | 3/1979 | Germany . | |
| 3008287 | 9/1980 | Germany . | |
| 3235220 | 12/1983 | Germany . | |
| 3621421 | 12/1987 | Germany . | |
| 4006016 | 8/1991 | Germany . | |
| 9217005 | 7/1993 | Germany . | |
| 1357607 | 12/1987 | U.S.S.R. . | |
| 1454472 | 11/1976 | United Kingdom . | |
| 2165619 | 4/1986 | United Kingdom . | |
| 2189005 | 10/1987 | United Kingdom . | |
| 86/04122 | 7/1986 | WIPO . | |

Primary Examiner—Thomas E. Denion
Attorney, Agent, or Firm—Spencer, Frank & Schneider

[57] ABSTRACT

A piston-and-control rod assembly includes a hollow piston having a skirt; axially spaced, circumferential piston ring grooves provided in the skirt; a radial crown having an inner face; and a bearing block projecting from a central portion of the inner face and having a bearing bore oriented radially to the piston axis. The bearing bore is situated in a zone approximately radially adjacent the piston ring grooves. The assembly further includes a connecting rod having a main connecting rod body; a head portion located at an end of the main connecting rod body and being laterally offset relative thereto in a direction of offset; and a piston pin affixed to the head portion and projecting unilaterally therefrom in a direction opposite to the direction of offset. The piston pin is received in the bearing bore.

6 Claims, 1 Drawing Sheet

PISTON-AND-CONNECTING ROD ASSEMBLY

CROSS REFERENCE TO RELATED APPLICATION

This application claims the priority of German Application No. P 43 37 473.5 filed Nov. 3, 1993, which is incorporated herein by reference.

BACKGROUND OF THE INVENTION

This invention relates to a piston-and-connecting rod assembly, particularly for internal combustion engines. To the head of the connecting rod a piston pin is affixed which is supported in a bearing mounted centrally in the inner piston base approximately at the height of the compression piston rings held circumferentially on the piston skirt.

A great number of constructions are known where the piston is provided with two diametrically opposite bearing holes through which a piston pin extends which itself passes through an opening provided in the head of the connecting rod. In structures of this type it is not feasible to relocate the piston pin axially (with respect to the piston axis) to such an extent towards the piston bottom that the piston pin is situated radially adjacent a piston ring groove, because in such a case the bore holes in the piston skirt would pass through the piston ring grooves with the result that the piston rings can no longer perform their sealing function.

To avoid the above-outlined difficulty, it is known to make multi-part pistons. Thus, German Offenlegungsschrift (application published without examination) 32 35 220 discloses a piston which has a first part forming the piston body and the piston skirt and a second, inner part which forms a bearing (articulation) for a connecting rod. The second part has two cylindrical bore holes which are oriented perpendicularly to the piston axis and which serve as bearings for a piston pin. As a first step in assembling the piston, the second part is coupled with the connecting rod and thereafter the second part is secured to the piston bottom by means of screws. Thus, in such prior art arrangements several individual components have to be manufactured, assembled, fitted to one another and bolted together.

SUMMARY OF THE INVENTION

It is an object of the invention to provide an improved piston-and-connecting rod assembly of the above-outlined type in which the number of individual components is reduced and which, at the same time, permits an easier assembly of the individual parts without increasing the structural height of the piston.

This object and others to become apparent as the specification progresses, are accomplished by the invention, according to which, briefly stated, the head of the connecting rod is laterally offset relative to the length of the connecting rod body and the piston pin is secured to the connecting rod head such that it projects unilaterally from the connecting rod head against the direction of the offset.

By virtue of the construction according to the invention it is feasible to form the connecting rod bearing as a one-piece component with the piston. The connecting rod may be coupled to the piston by simply inserting the piston pin into the connecting rod bearing without the need of additional connecting elements such as screws. Therefore, the invention provides that the piston-and-connecting rod unit may be reduced to two individual components whose assembly may be automated in a simple manner. Preferably, the connecting rod head is offset in such a manner that the force exerted on the pin extends through the middle of the pin and the effective force path coincides with the center line of the main connecting rod body with respect to which the connecting rod head is offset. It is further feasible to form the piston pin on the connecting rod head as a one-piece, unitary component therewith.

According to a further feature of the invention, the connecting rod head has, adjacent the pin, a supporting bearing face axially engaging the piston bottom. In this manner a direct force transmission from the piston to the connecting rod is achieved without exerting a bending stress on the piston pin. The force exerted on the piston pin and the support bearing is, by means of an appropriate offset of the connecting rod head guided through the piston center and the force path coincides with the longitudinal axis (longitudinal center line) of the main connecting rod body. For enhancing lubrication of the connecting rod bearing, the lateral faces of the piston pin are flattened at diametrically opposite locations.

DESCRIPTION OF THE PREFERRED EMBODIMENT

Figure 1:
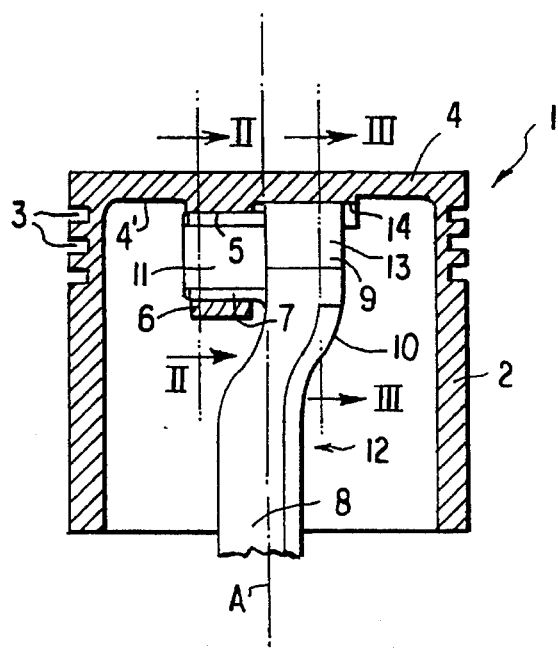
FIG. 1 is an axial sectional view of a preferred embodiment of the piston-and-connecting rod assembly according to a preferred embodiment of the invention.

FIG. 1 illustrates a piston-and-connecting rod assembly according to a preferred embodiment of the invention, generally designated at 1. The assembly includes a hollow piston 2 which is a one-piece construction and which has a cylindrical skirt provided with a plurality of axially spaced piston ring grooves 3. From the inner face 4' of the piston crown 4 there projects a connecting rod bearing block 5 which has no contact with the cylindrical skirt of the piston 2 and which has a radially oriented bore hole (bearing bore) 6.

Figure 1A:
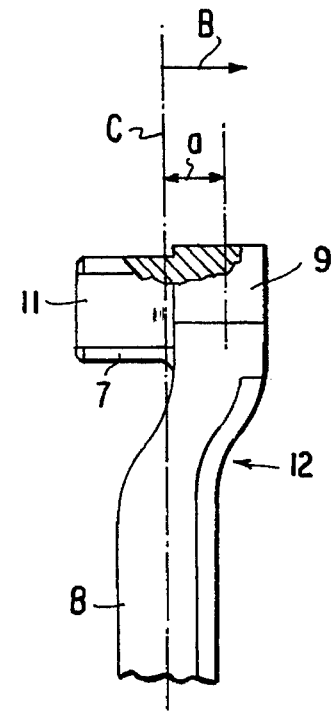
FIG. 1a is a fragmentary, partially sectional view of the connecting rod according to the preferred embodiment.

The piston-and-connecting rod assembly 1 further includes a connecting rod generally designated at 12 which has a main body 8 and a head 9. Stated differently, as shown in FIG. 1a, the connecting rod head 9 is offset by a distance a in the direction B relative to the length dimension of the main body 8 of the connecting rod 12, represented by the longitudinal center line C of the main body 8. It is further seen that the piston pin 7 extends from the head 9 in a direction opposite to the direction B. In FIG. 1a, the upper part of the piston pin 7 and the head 9 is shown in section to illustrate that the pin 7 and the head 9 constitute a one-piece, unitary component. As indicated at 10, the connecting rod head 9 is offset laterally relative to the length of the main body 8, that is, radially relative to the piston axis A and carries, as a one-piece, unitary component, a piston pin 7 which extends radially in a direction opposite to the direction of offset of the head 9. The piston pin 7 is received in the bearing bore 6 of the connecting rod bearing block 5. The connecting rod head 9 has an arcuate outer face 13 which is axially supported on a counterface 14 of an elevation 15 formed on the inner face 4' of the piston crown 4.

For installing the connecting rod 12, the latter is introduced axially into the piston 2 in such a manner that the pin 7 is first situated radially adjacent the bearing bore 6 and then the connecting rod 12 is shifted radially so that the pin 7 may penetrate into the bearing bore 6, whereby the connecting rod 12 and the piston 2 are hooked together.

Figure 2:
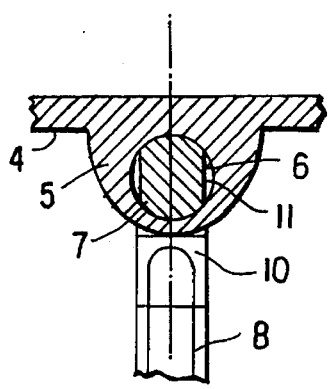
FIG. 2 is a sectional view taken along line II—II of FIG. 1.ba

FIG. 2 shows that the pin 7 is provided with diametrically opposite flattened portions 11 which facilitates the lubrication of the bearing bore 6.

Figure 3:
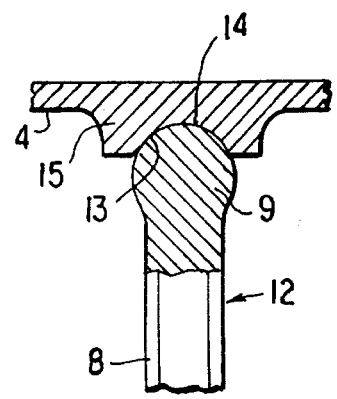
FIG. 3 is a sectional view taken along line III—III of FIG. 1.

FIG. 3 shows that the connecting rod 12 serves as an axial support as the arcuate head surface 13 engages the complemental bearing surface 14 of the elevation 15 formed on the inner face 4' of the piston crown 4.

It will be understood that the above description of the present invention is susceptible to various modifications, changes and adaptations, and the same are intended to be comprehended within the meaning and range of equivalents of the appended claims.

What is claimed is:

1. A piston-and-control rod assembly comprising
   (a) a hollow piston having
      (1) an axis;
      (2) a skirt;
      (3) axially spaced, circumferential piston ring grooves provided in said skirt;
      (4) a radial crown having an inner face; and
      (5) a bearing block projecting from a central portion of said inner face and having a bearing bore oriented radially to said axis; said bearing bore being situated in a zone approximately radially adjacent the piston ring grooves; and
   (b) a connecting rod having
      (1) a main connecting rod body;
      (2) a head portion located at an end of said main connecting rod body and being laterally offset relative to a length of the main connecting rod body in a direction of offset; and
      (3) a piston pin affixed to said head portion and projecting unilaterally therefrom in a direction opposite to said direction of offset; said piston pin being received in said bearing bore.

2. The piston-and-control rod assembly as defined in claim 1, wherein said head portion is laterally offset to an extent such that a resultant force acting on said piston pin passes through a center of said piston pin and a path of the force is in alignment with a longitudinal axis of said main connecting rod body.

3. The piston-and-control rod assembly as defined in claim 1, wherein said piston pin and said head portion form a single, one-piece component.

4. The piston-and-control rod assembly as defined in claim 1, further comprising an arcuate bearing surface provided on said head portion adjacent said piston pin and a supporting surface provided on said inner face of said crown; said bearing surface of said head portion being in engagement with said supporting surface of said inner base face, whereby said connecting rod is directly axially supported on said inner face.

5. The piston-and-control rod assembly as defined in claim 1, wherein said head portion is laterally offset to an extent such that a resultant force acting on said piston pin and said bearing surface of said head portion passes through a center of said piston and a path of the force is in alignment with a longitudinal axis of said main connecting rod body.

6. The piston-and-control rod assembly as defined in claim 1, wherein said piston pin has diametrically opposite flattened portions.

* * * * *